(12) United States Patent
Morinaga

(10) Patent No.: US 10,712,623 B2
(45) Date of Patent: Jul. 14, 2020

(54) DISPLAY PANEL

(71) Applicant: SHARP KABUSHIKI KAISHA, Sakai, Osaka (JP)

(72) Inventor: Junichi Morinaga, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/389,487

(22) Filed: Apr. 19, 2019

(65) Prior Publication Data

US 2019/0331971 A1 Oct. 31, 2019

(30) Foreign Application Priority Data

Apr. 26, 2018 (JP) .................................. 2018-085153

(51) Int. Cl.
*G02F 1/1362* (2006.01)
*G09G 3/36* (2006.01)
*G02F 1/1335* (2006.01)

(52) U.S. Cl.
CPC .. *G02F 1/136209* (2013.01); *G02F 1/133514* (2013.01); *G09G 3/3607* (2013.01); *G09G 3/3648* (2013.01)

(58) Field of Classification Search
CPC combination set(s) only.
See application file for complete search history.

(56) References Cited

U.S. PATENT DOCUMENTS

2015/0002751 A1* 1/2015 Hosoki ............. G02F 1/133308
348/794
2016/0202531 A1 7/2016 Park

FOREIGN PATENT DOCUMENTS

JP 2014-002385 A 1/2014

* cited by examiner

*Primary Examiner* — Van N Chow
(74) *Attorney, Agent, or Firm* — ScienBiziP, P.C.

(57) ABSTRACT

A display panel includes two substrates, pixel units arranged in rows and columns on the substrates and at least including first pixel units adjacent to each other and a second pixel unit having a different color from the first pixel units and being configured to provide a brighter display than the first pixel units when the first pixel units and the second pixel unit are at the same gray level, an inter-pixel light blocking portion disposed on at least one of the two substrates and separating the pixel units adjacent to each other, a spacer overlapping the inter-pixel light blocking portion at a position adjacent to at least one of the first pixel units and disposed between the two substrates to keep a distance between the two substrates, and extended light blocking portions extending from the inter-pixel light blocking portion to inner sides of the first pixel units.

14 Claims, 8 Drawing Sheets

DISPLAY PANEL

CROSS REFERENCE TO RELATED APPLICATION

This application claims priority from Japanese Patent Application No. 2018-085153 filed on Apr. 26, 2018. The entire contents of the priority application are incorporated herein by reference.

TECHNICAL FIELD

The technology described herein relates to a display panel.

BACKGROUND

An example of a known liquid crystal display device is described in Japanese Unexamined Patent Application Publication No. 2014-2385. Such a liquid crystal display device includes a light blocking member that includes multiple extended portions each having a predetermined planar shape on one of opposing first and second substrates over multiple pixel areas and multiple first spacers that are disposed on one of the first and second substrates and in contact with a top thin film on the other of the first and second substrates. The extended portions include first and second extended portions. The first extended portion overlaps the first spacer and the second extended portion does not overlap the first spacer.

SUMMARY

In such a liquid crystal display device, a difference in the aperture ratio between the pixel having the spacer and the pixel not having the spacer is reduced to prevent a decrease in display quality such as display unevenness while a predetermined cell gap is kept. However, in the above liquid crystal display device, the extended portions of the light blocking member are disposed at a predetermined interval in a zigzag pattern in a plan view and are randomly arranged with respect to the colors of the pixels. In this configuration, if a pixel having a relatively bright color has the extended portion, the brightness would decrease.

The technology described herein was made in view of the above circumstances. An object is to provide a display panel in which a decrease in the brightness is less likely to occur.

A display panel according to the technology includes two substrates, pixel units arranged in rows and columns in a plate surface area of the substrates and at least including first pixel units adjacent to each other and a second pixel unit that has a different color from the first pixel units and is configured to provide a brighter display than the first pixel units when the first pixel units and the second pixel unit are at the same gray level, an inter-pixel light blocking portion disposed on at least one of the two substrates and separating the pixel units adjacent to each other, a spacer overlapping the inter-pixel light blocking portion at a position adjacent to at least one of the first pixel units and disposed between the two substrates to keep a distance between the two substrates, and multiple extended light blocking portions extending from the inter-pixel light blocking portion to inner sides of the first pixel units.

With this configuration, a predetermined image is displayed when each of the pixel units arranged in rows and columns in the plate surface area of the two substrates provides a display at a predetermined gray level, h display gray level of each of the pixel units is reliably kept by the inter-pixel light blocking portions, which separate the pixel units adjacent to each other. The distance between the substrates is maintained by the spacer disposed therebetween. The spacer is adjacent to at least one of the first pixel units. The spacer, which is disposed between the substrates, may rub against a surface of one of the substrates. The bits rubbed off by the spacer may cause a bright dot defect. Although the spacer overlaps the inter-pixel light blocking portion, the bright dot defect caused by the rubbed-off bits may be visually perceivable at the first pixel unit adjacent to the spacer. To solve the problem, the inter-pixel light blocking portion includes the extended light blocking portions each extending to the inner side of the corresponding first pixel unit. This reduces the possibility that the bright dot defect will be visually perceivable at the first pixel unit adjacent to the spacer and reduces the difference in the aperture ratio between the first pixel unit adjacent to the spacer and the first pixel unit not adjacent to the spacer. Furthermore, the first pixel units have the extended light blocking portions but the second pixel unit, which provides a bright display compared with the first pixel unit when the first and second pixel units are at the same gray level, do not have tie extended light blocking portion. This allows the second pixel unit to have a higher aperture ratio than the first pixel unit, reducing a decrease in the brightness caused by the extended light blocking portion.

According to the technology described herein, a decrease in the brightness is less likely to occur.

DETAILED DESCRIPTION

First Embodiment

Figure 3:
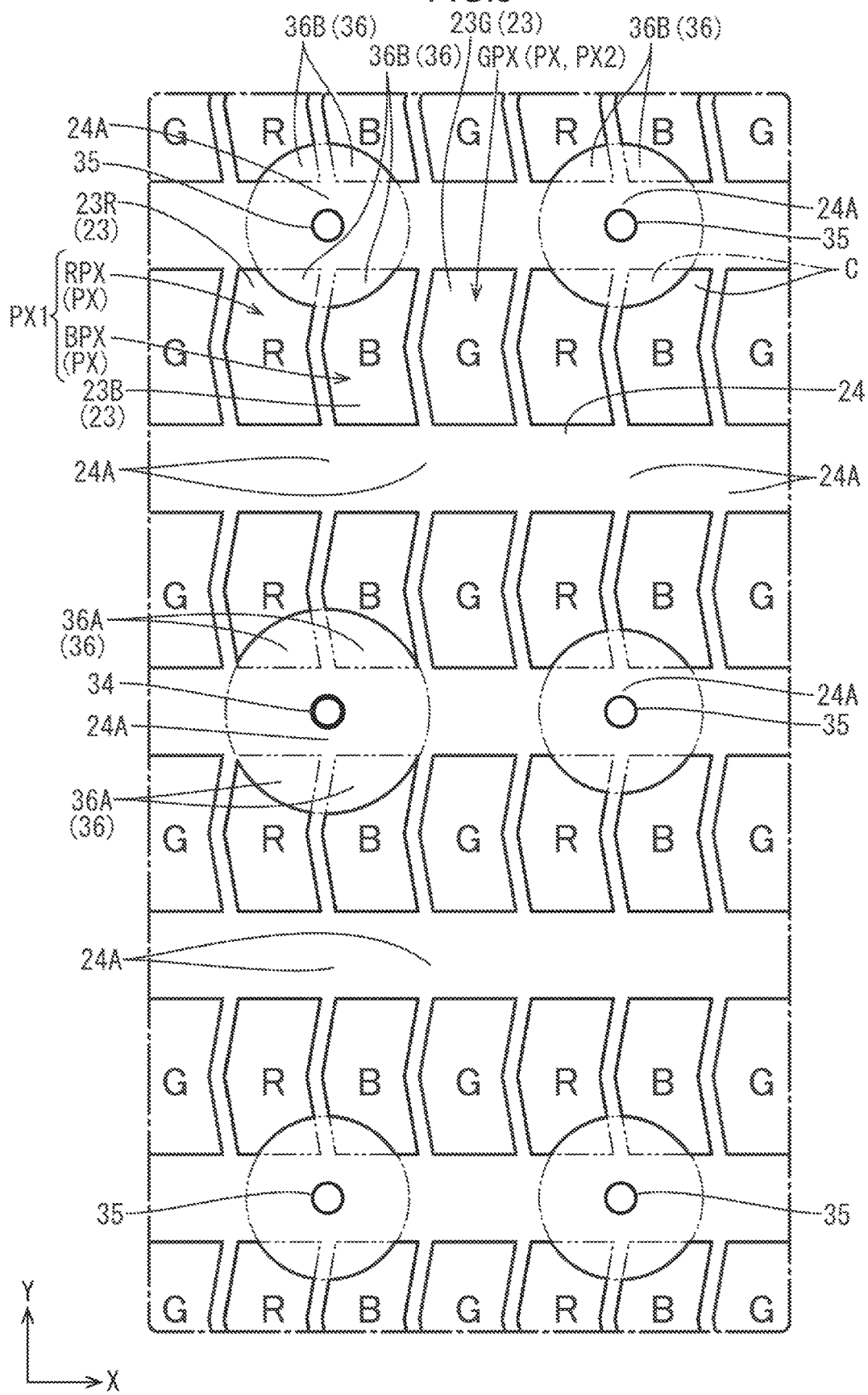
FIG. 3 is a plan view illustrating a pixel arrangement on a CF substrate included in the liquid crystal panel.
Figure 4:
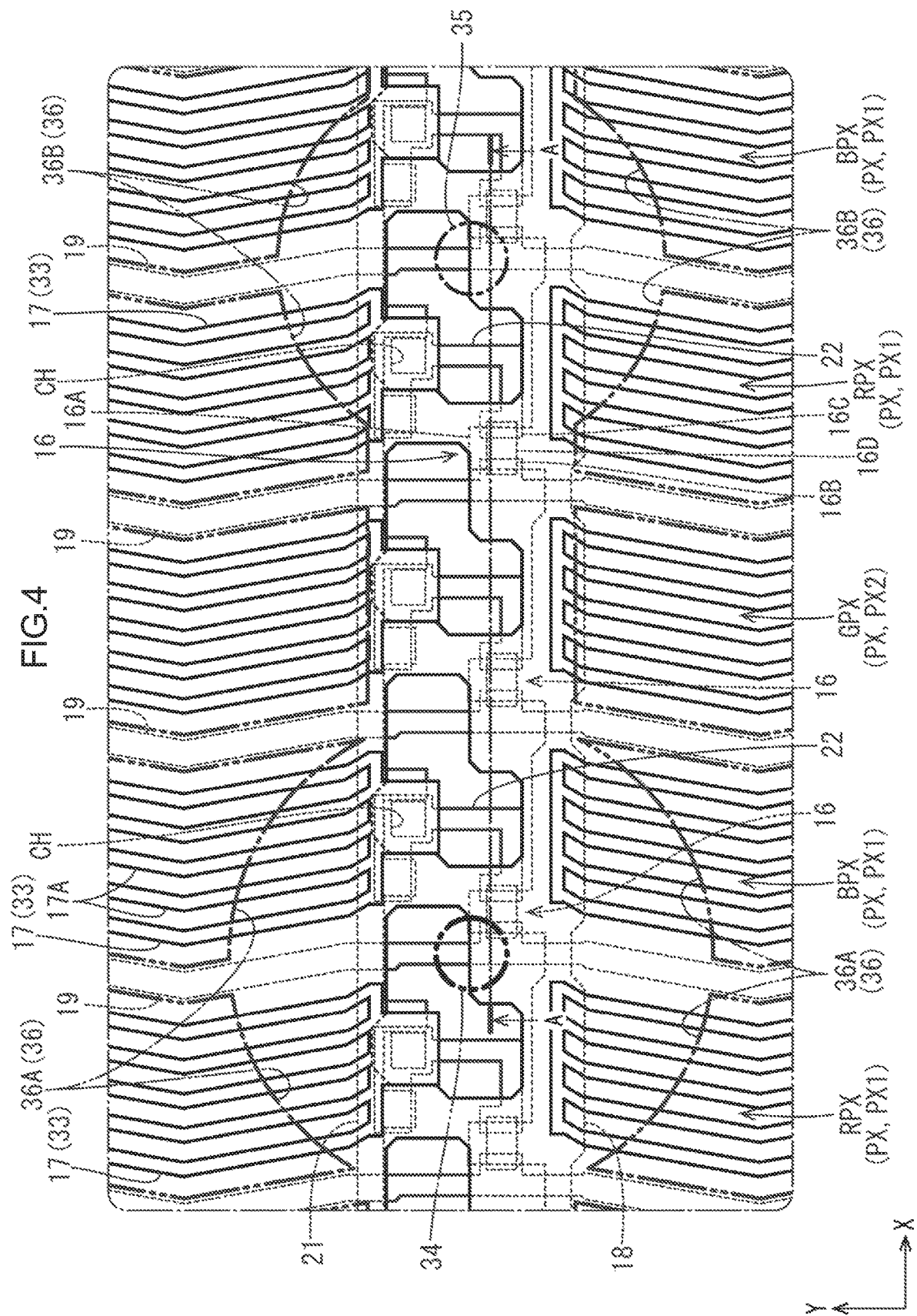
FIG. 4 is a magnified plan view illustrating portions around TFTs on the array substrate.
Figure 5:
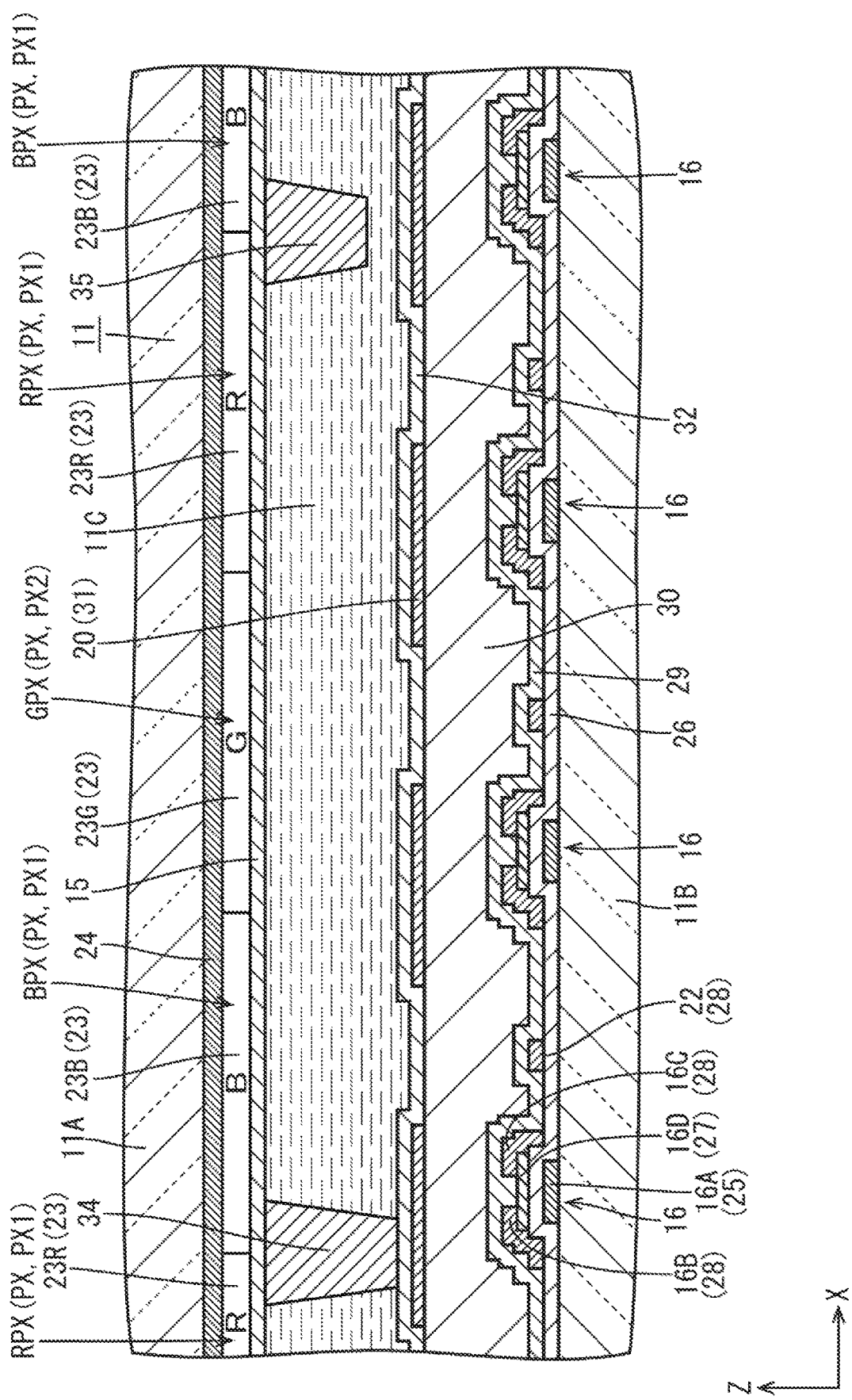
FIG. 5 is a cross-sectional view illustrating the liquid crystal panel taken along line A-A in FIG. 4.

A first embodiment is described with reference to FIGS. 1 to 5. In this embodiment, a liquid crystal panel (display panel) 11 included in a liquid crystal display device 10 is described as an example. The x axis, the Y axis, and the Z axis are indicated in some of the drawings, and each of the axes indicates the same direction in the respective drawings. The upper side in FIG. 5 is a front side and the lower side in FIG. 5 is a rear side.

Figure 1:
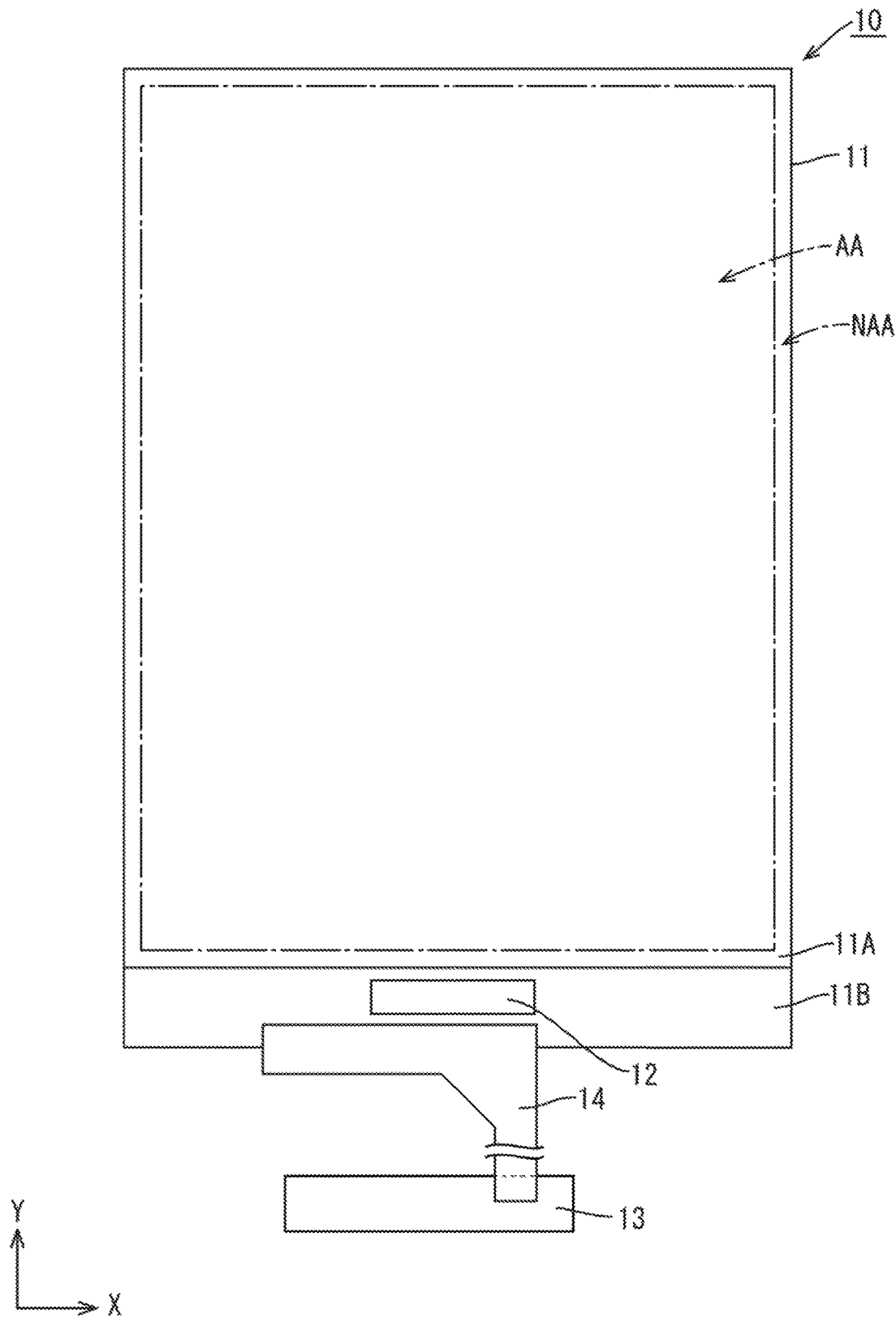
FIG. 1 is a schematic plan view illustrating connections between a liquid crystal panel, a flexible board, and a control circuit board, which are included in a liquid crystal display device according to a first embodiment of the technology described herein.

FIG. 1 is a schematic plan view indicating connections between the liquid crystal panel 11, a flexible board 14, and a control circuit board 13, which are included in the liquid crystal display device 10. As illustrated in FIG. 1, the liquid crystal display device 10 includes the liquid crystal panel 11 that displays an image thereon, a driver (panel driving component, driving circuit component) 12 that drives the liquid crystal panel 11, the control circuit board (external signal supply) 13 that supplies various external input signals to the driver 12, the flexible board (external connector) 14 that electrically connects the liquid crystal panel 11 to the control circuit board 13, and a backlight device that is an external light source located on a rear side of the liquid crystal panel 11 and configured to apply display light to the liquid crystal panel 11. The driver 12 and the flexible board 14 are disposed on the liquid crystal panel 11 with an anisotropic conductive film (ACF) therebetween.

As illustrated in FIG. 1, the liquid crystal panel 11 has a vertically-long oblong overall (rectangular) shape. A middle area of a plate surface of the liquid crystal panel 11 is a display area (active area) AA on which an image is displayed. A frame-like outer peripheral area of the plate surface of the liquid crystal panel 11 in plan view, which surrounds the display area AA, is a non-display area (non-active area) NAA. The short-side direction, the long-side direction, and the thickness direction of the liquid crystal panel 11, respectively, match the X axis direction, the Y axis direction, and the Z axis direction in the drawings. In FIG. 1, a one-dot chain line indicates an outline of the display area AA. The area outside the one-dot chain line is the non-display area NAA. The liquid crystal panel 11 at least includes two glass substrates 11A and 11B. One of the glass substrates on the front side (upper side) is the CF substrate (first substrate, opposing substrate) 11A and the other on the rear side (lower side) is the array substrate (second substrate, thin film transistor substrate) 11B. A polarizing plate is attached to the outer surface of each of the substrates 11A and 11B.

Figure 2:
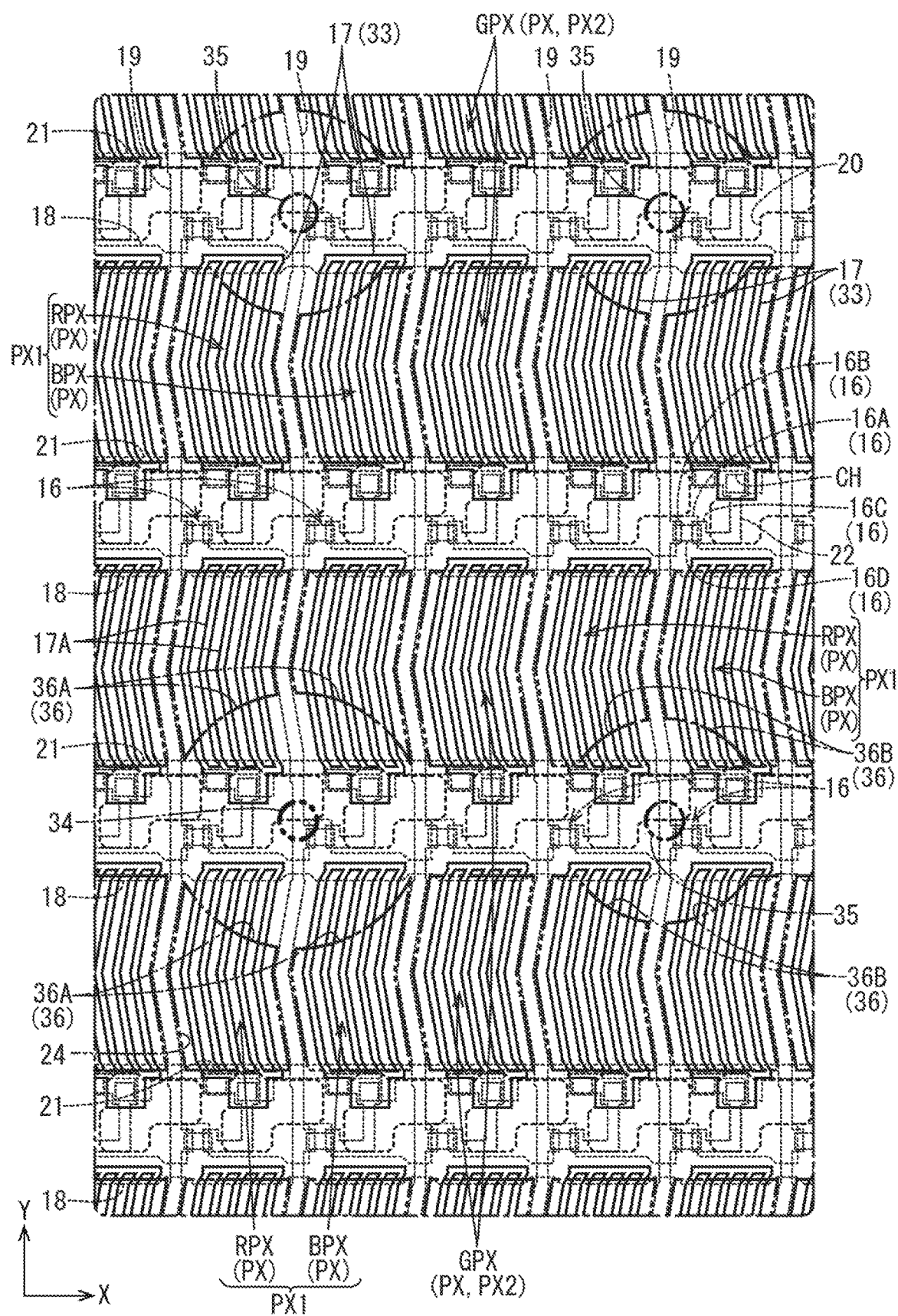
FIG. 2 is a plan view indicating a pixel arrangement on an array substrate included in the liquid crystal panel.

The configuration of the array substrate 11B is described with reference to FIG. 2. FIG. 2 is a plan view illustrating a pixel arrangement on the array substrate 11B. As illustrated in FIG. 2, TFTs (thin film transistors) 16, which are switching elements, and pixel electrodes 17 are arranged in the X axis direction (a row direction) and the Y axis direction (a column direction) in a matrix (rows and columns) in the display area AA of an inner surface of the array substrate 11B. The TFTs 16 and the pixel electrodes 17 are surrounded by gate lines (scanning lines) 18 and source lines (signal lines, data lines) 19, which form a grid-like pattern. The gate lines 18 each extend straight in the X axis direction. The source lines 19 each extend in a zigzag line substantially in the Y axis direction. The TFT 16 has a gate electrode 16A connected to the gate line 18, a source electrode 16B connected to the source line 19, a drain electrode 16C connected to the pixel electrode 17 through a drain line 22, which will be described later, and a channel portion 16D connected to the source electrode 16B and the drain electrode 16C. The TFT 16 is activated by a scanning signal applied to the gate line 18. The potential relating to an image signal applied to the source line 19 is applied to the drain electrode 16C through the channel portion 16D, and thus the pixel electrode 17 is charged to a potential relating to the image signal.

As illustrated in FIG. 2, the pixel electrodes 17 are each disposed in a vertically-long rectangular area defined by two gate lines 18 and two source lines 19. The long sides of the pixel electrode 17 extend in zigzag lines parallel to the source lines 19. The pixel electrode 17 has multiple slits 17A (four slits in FIG. 2) extending along the long sides thereof. Solid common electrodes 20 are disposed in the display area AA of the inner surface of the array substrate 11B at positions corresponding to the pixel electrodes 17. When a potential difference is produced between the pixel electrode 1 and the common electrode 20 that overlap each other, a fringing electric field (oblique electric field) containing components normal to the plate surface of the array substrate 11B, in addition to a component parallel to the plate surface of the array substrate 11B, is applied to a liquid crystal layer 11C, which will be described later, at positions near the slits 17A. In other words, the liquid crystal panel 11 in this embodiment operates in fringe field switching (FFS) mode. Furthermore, a capacitance line 21 is disposed between two gate lines 18 that have the pixel electrodes 17 therebetween in the Y axis direction. The capacitance line 21 extends in parallel to the gate lines 18 across the pixel electrodes 17 and the source lines 19. The capacitance line 21 is in a different layer from the pixel electrodes 17 and the source lines 19. The capacitance line 21 overlaps a portion of the pixel electrode 17 and forms a capacitance with the pixel electrode 17. The potential of the pixel electrode 17 charged by the TFT 16 is kept for a predetermined time period by the capacitance line 21. The capacitance line 21 is in the same layer as the gate line 18. The potential of the capacitance line 21 is equal to that of the common electrode 20 but may be different from that of the common electrode 20.

The configuration of a CF substrate 11A is described with reference to FIG. 3. FIG. 3 is a plan view indicating a pixel arrangement on the CF substrate 11A. As illustrated in FIG. 3, color filters 23 are disposed in the display area AA of the inner surface of the CF substrate 11A at positions corresponding to the pixel electrodes 17 of the array substrate 11B. The color filters 23 having different colors are repeatedly arranged in the X axis direction (row direction) and the rows of the color filters 23 are arranged in the Y axis direction (column direction) to form a stripe-like pattern as a whole. The color filters 23 each extend in a zigzag line in the Y axis direction so as to correspond to the planar shape of the pixel electrodes 17 (source lines 19) each extending in the Y axis direction. The color filters 23 include red color filters 23R, which selectively transmit red light having a wavelength in a wavelength range of red, blue color filters 23B, which selectively transmit blue light having a wavelength in a wavelength range of blue, and green color filters 23G, which selectively transmit green light having a wavelength in a wavelength range of green. The color filters 23 in three colors, i.e., the red color filters 23R, the blue color filters 23B, and the green color filters 23G are repeatedly arranged in this order in the X axis direction. The color filters 23 overlap the pixel electrodes 17 (FIG. 2) on the array substrate 11B in plan view and constitute pixel units PX with the pixel electrodes 17. The pixel units PX are arranged in the X axis direction and the Y axis direction in a matrix on the plate surface of the liquid crystal panel 11. The pixel units PX include red pixel units RPX, which selectively transmit red light having a wavelength in a wavelength range of red, blue pixel units BPX, which selectively transmit blue light having a wavelength in a wavelength range of blue, and green pixel units GPX, which selectively transmit green light having a wavelength in a wavelength range of green. In the liquid crystal panel 11 having such a configuration, the three pixel units RPX, BPX, and GPX that are adjacent to each other in the X axis direction constitute a display pixel that provides a color display of a predetermined gray level. The red and blue pixel units RPX and BPX, which selectively transmit red light and blue light that are lower in relative luminous efficiency than green light transmitted by the green pixel units GPX, are classified as first pixel units PX1 that provide a relatively dark display when the pixel units RPX, BPX, and GPX are at the same gray level. In contrast, the green pixel units GPX, which transmit green light that is higher in relative luminous efficiency than red and blue light transmitted by the red and blue pixel units RPX and BPX, are classified as second pixel units PX2 that provide a brightest display when the pixel units RPX, BPX, and GPX are at the same gray level. The first pixel units PX1 may be referred to as "low relative luminous efficiency pixel units" that selectively transmit light having a wavelength of low relative luminous efficiency compared with the second pixel units PX2. The second pixel units PX2 may be referred to as "high relative luminous efficiency pixel units" that selectively transmit light having a wavelength of high relative luminous efficiency compared with the first pixel units PX1.

As illustrated in FIG. 3, an inter-pixel light blocking portion (black matrix) 24 that separates the pixel units PX adjacent to each other in the X axis direction and the Y axis direction is disposed in the display area AA of the inner surface of the CF substrate 11A. The inter-pixel light blocking portion 24 has a grid-like overall shape in plan view. The portions of the grid-like inter-pixel blocking portion 24 extending in the X direction separate the pixel units PX adjacent to each other in the Y axis direction and the portions extending in the Y axis direction separate the pixel units PX adjacent to each other in the X axis direction. In other words, the inter-pixel light blocking portion 24 includes multiple crisscross intersecting portions 24A adjoining in the X axis direction and the Y axis direction such that each of the intersecting portions 24A separates four pixel units PX including two pixel units PX adjacent to each other in the X axis direction and two pixel units PX adjacent to each other in the Y axis direction. The inter-pixel light blocking portion 24 does not allow the light to travel between the pixel units PX adjacent to each other in the X axis direction and the Y axis direction, allowing each pixel unit PX to keep the independence of display gray level. Furthermore, an overcoat film (flattening film) 15 is disposed on the inner surface (upper layer) of the color filter 23.

The TFT 16 is described in detail with reference to FIG. 4. As illustrated in FIG. 4, the TFT 16 is adjacent to a lower side of the pixel electrode 17, which is a connection target, in the Y axis direction. The gate electrode 16A included in the TFT 16 branches from the gate line 18 and extends in the Y axis direction toward the pixel electrode 17. The source electrode 16B included in the TFT 16 branches from the source line 19 and extends in the X axis direction toward the gate electrode 16A. The leading end of the source electrode 16B overlaps the gate electrode 16A. The drain electrode 16C included in the TFT 16 is spaced apart from the source electrode 16B in the X axis direction and partly overlaps the gate electrode 16A. The drain electrode 16C and the source electrode 16B are in the same layer. A drain line (pixel electrode connection line) 22, which will be described later, is connected to the drain electrode 16C at one end thereof. The channel portion 16D included in the TFT 16 overlaps the gate electrode 16A with a gate insulating film 26, which will be described later, therebetween and connected co the source electrode 16B and the drain electrode 16C. The channel portion 16D extends in the X axis direction across the gate electrode 16A and is connected to the source electrode 16B at one end and connected to the drain electrode 16C at the other end. The drain line 22 is in the same layer as the drain electrode 16C. The drain line 22 is bent to have an L-like overall shape in plan view and connected to the drain electrode 16C at one end and connected to the pixel electrode 17 at the other end.

Next, films on the inner surface of the array substrate 11B are described with reference to FIG. 5. FIG. 5 is a cross-sectional view of the liquid crystal panel 11 taken along a line near the TFTs 16. As illustrated in FIG. 5, a first metal film (gate metal film) 25, a gate insulating film 26, a semiconductor film 27, a second metal film (source metal film) 28, a first inter-layer insulating film 29, a flattening film 30, a first transparent electrode film 31, a second inter-layer insulating film 32, and a second transparent electrode film 33 are disposed in this order from the lower side on the array substrate 11B. In FIG. 5, the second transparent electrode film 33 is not illustrated. The reference number 33 is indicated in FIGS. 2 and 4.

The first metal film 25 is a layered film including layers of different metals or a single-layer film including one kind of metal. As illustrated in FIG. 5, the first metal film 25 provides the gate line 18, the capacitance line 21, the gate electrode 16A of the TFT 16, and an auxiliary line, for example. The gate insulating film 26 is formed of an inorganic insulating material (inorganic material) such as SiN, and SiO$_2$. The semiconductor film 27 is a thin film formed of an oxide semiconductor, for example, and forms the channel portion 16D of the TFT 16. The second metal film 28 is a layered film or a single-layer film, as the first metal film 25, and provides the source line 19, the drain line 22, and the source electrode 16B and the drain electrode 16C of the TFT 16. The first inter-layer insulating film 29 is formed of an inorganic insulating material as the gate insulating film 26. The flattening film 30 is formed of an organic insulating material (organic material) such as PMMA (acrylic resin) and has a thickness larger than that of the other insulating films 26, 29, and 32, which are formed of an inorganic resin material. The flattening film 30 planarizes the surface of the array substrate 11B. The first transparent electrode film 31 is formed of a transparent electrode material such as an ITO and forms the common electrode 20. The second inter-layer insulating film 32 is formed of an inorganic insulating material as the gate insulating film 26. The second transparent electrode film 33 is formed of a transparent electrode material as the first transparent electrode film 31 and forms the pixel electrode 17. The first inter-layer insulating film 29, the flattening film 30, and the second inter-layer insulating film 32 have a contact hole CH through which the pixel electrode 17 formed of the second transparent electrode film 33 is connected to the drain line 22 formed of the second metal film 28. The contact hole CH overlaps both the pixel electrode 17 and the drain electrode 22 in plan view. The first inter-layer insulating film 29, the flattening film 30, and the second inter-layer insulating film 32 are solid films and are disposed over at least the entire display area AA, except for the contact hole CH.

As illustrated in FIG. 5, a liquid crystal layer 11C including liquid crystal molecules, which are substances whose optical properties are changed by application of an electrical filed, is disposed between the substrates 11A and 11B included in the liquid crystal panel 11. Furthermore, a spacer 34 and a sub spacer 35 are disposed between the substrates 11A and 11B to keep a space (cell gap) corresponding to the thickness of the liquid crystal layer 11C. The spacer 34 and the sub spacer 35 are formed of a resin material. The spacer 34 and the sub spacer 35 in the display area AA of the CF substrate 11A protrude from the overcoat film 15 in the Z axis direction toward the array substrate 11B through the liquid crystal layer 11C. The spacer 34 protrudes more from the CF substrate 11A than the sub spacer 35 and is in contact with the surface (inner surface) of the array substrate 11B at the leading end surface. The sub spacer 35 protrudes less from the CF substrate 11A than the spacer 34 such that a space is formed between the leading end surface thereof and the surface of the array substrate 11B. The spacer 34, which is on the CF substrate 11A and in contact with the surface of the array substrate 11B, allows the substrates 11A and 11B to have a space corresponding to the thickness of the liquid crystal layer 11C therebetween. One of the substrates 11A and 11B may be deformed by an amount corresponding to the space between the sub spacer 35 on the CF substrate 11A and the surface of the array substrate 11B when pressed to the inner side by an external force. In such a case, the deformation is stopped by the sub spacer 35 that has come in contact with the surface of the array substrate 11B. The spacer 34 and the sub spacer 35 both have a circular planer shape and a cylindrical overall shape (FIGS. 2 and 3). An alignment film, which regulates the alignment of the liquid crystal molecules in the liquid crystal layer 11C, is disposed on each of the substrates 11A and 11B as an innermost surface adjacent to the liquid crystal layer 11C. The spacer 34 and the sub spacer 35 come in contact with the alignment film on the array substrate 31B at the leading end surface.

The planar arrangement of the spacers 34 and the sub spacers 35 relative to the CF substrates 11A and the array substrate 11B is described in detail with reference to FIGS. 2 and 3. As illustrated in FIGS. 2 and 3, the spacer 34 and the sub spacers 35 overlap the inter-pixel light blocking portion 24 at positions adjacent to predetermined pixel units PX. Specifically described, the spacer 34 and the sub spacers 35 are adjacent to the red pixel units RPX and the blue pixel units BPX, which are the first pixel units PX1 that provide a dark display when the red, blue, and green pixel units RPX, BPX, and GPX are at the same gray level. In other words, the spacer 34 and the sub spacers 35 are each disposed between the red pixel unit RPX and the blue pixel unit BPX, which are adjacent to each other in the X axis direction. The spacer 34 and the sub spacers 35 are not adjacent to the green pixel units GPX, which are the second pixel units PX2 that provide a bright display when the red, blue, and green pixel units RPX, BPX, and GPX are at the same gray level. The spacer 34 and the sub spacers 35 each have the center at a position substantially corresponding to the center of the intersecting portion 24A of the inter-pixel light blocking portion 24, which separates the four of the pixel units PX adjacent to each other in the X axis direction and the Y axis direction (two red pixel units RPX and two blue pixel units BPX). The spacer 34 and the sub spacers 35 are arranged in a grid-like pattern with a space therebetween. Two of the spacer 34 and the sub spacers 35 adjacent to each other in the X axis direction have two intersecting portions 24A therebetween and two of the spacer 34 and the sub spacers 35 adjacent to each other in the Y axis direction have one intersecting portion 24A therebetween. In this configuration, the grid-like inter-pixel light blocking portion 24 include, as portions extending in the X axis direction, rows (spacer rows) having the spacer 34 and the sub spacers 35 and rows (non-spacer rows) not having the spacer 34 and the sub spacers 35. The spacer rows and the non-spacer rows are alternately arranged. The grid-like inter-pixel light blocking portion 21 include, as portions extending in the Y axis direction, columns (spacer columns) having the spacer 34 and the sub spacers 35 and columns (non-spacer columns) not having the spacer 31 and the sub spacers 35. The spacer columns are each located between the red pixel unit RPX and the blue pixel unit BPX. The green pixel units GPX are sandwiched between two non-spacer columns. The spacer 34 and the sub spacers 35 are located close to the TFTs 16 together with the inter-pixel light blocking portion 24, and thus off-leakage current of the TFTs 16 caused by external light is reduced. The number of spacers 34 is smaller than that of sub spacers 35.

The spacer 34, which is on the CF substrate 11A and in contact with the surface of the array substrate 11B at the leading end surface as illustrated in FIG. 5, may rub against the surface of the array substrate 11B. In such a case, the alignment film on the array substrate 11B may be rubbed off and the rubbed-off bits of the alignment film may be present in the liquid crystal layer 11C. The rubbed-off bits may cause a bright dot defect, which allows all light to pass regardless of the gray level of the pixel units PX. Although the spacer 34 overlaps the inter-pixel light blocking portion 24, the rubbed-off bits of the alignment film may scatter around the spacer 34 to the outside of the inter-pixel light blocking portion 24. In such a case, a bright dot defect may be visually perceivable. The bright dot defect is more likely to be visually perceivable at the first pixel unit PX1, which is adjacent to the spacer 34 and readily receives the rubbed-off bits of the alignment film. Furthermore, although the sub spacer 35 is normally spaced apart from the surface of the array substrate 11B, the sub spacer 35 comes in contact with the surface of the array substrate 11B upon application of an external force. Thus, the sub spacer 35 may rub off the alignment film on the array substrate 11B, although the volume of the rubbed-off bits is smaller than that rubbed off by the spacer 34. In other words, a bright dot defect, which caused by the rubbed-off bits of the alignment film, may also be visually perceivable at the first pixel unit PX1 adjacent to the sub spacer 35. The bits of the alignment film rubbed off by the sub spacer 35 are likely to scatter over an area smaller than the bits of the alignment film rubbed off by the spacer 34. In FIG. 3, outlines of estimated scattering areas of the bits of the alignment films rubbed off by the spacer 34 and the sub spacers 35 are partly indicated by a one-dot chain line.

To solve the above-described problem, as illustrated in FIG. 3, the inter-pixel light blocking portion 24 on the CF substrate HA included in the liquid crystal panel 11 according to the embodiment includes extended light blocking portions 36 extending to the inner sides of the predetermined pixel units PX. In FIG. 3, the formation areas of the extend light blocking portions 36 are indicated by two-dot chain lines. The extended light blocking portions 36 are selectively disposed relative to the red pixel units RPX and the blue pixel units BPX, which are the first pixel units PX1 that provide a dark display when the red, blue, and green pixel units RPX, BPX, and GPX are at the same gray level. In other words, the extended light blocking portions 36 are selectively disposed relative to the red pixel units RPX and the blue pixel units BPX adjacent to the spacer 34 and the sub spacers 35. The extended light blocking portions 36 are disposed not only relative to the red and blue pixel units RPX and BPX adjacent to the spacer 34, but also relative to the red and blue pixel units RPX and BPX not adjacent to the spacer 34 but adjacent to the sub spacer 35. In this configuration, the extended light blocking portions 36 include first extended light blocking portions 36A extending to the first pixel units PX1 that are adjacent to the spacer 34 and second extended light blocking portions 36B extending to the first pixel units PX1 that are adjacent to the sub spacer 35. The extended light blocking portions 36 are not disposed relative to the green pixel units GPX, which are the second pixel units PX2 that provide a bright display when the red, blue, and green pixel units RPX, BPX, and GPX are at the same gray level. As described above, the inter-pixel light blocking portion 21 includes the extended light blocking portions 36 extending to the inner sides of the first pixel units PX1. This reduces the possibility that the bright dot defect caused by the rubbed-off bits of the alignment film will be visually perceivable at the red pixel units RPX and the blue pixel units BPX, which are the first pixel units PX1 adjacent to the spacer 34 and the sub spacers 35. In addition, this reduces a difference in the aperture ratio between the first pixel unit PX1 adjacent to the spacer 34 and the first pixel unit PX1 not adjacent to the spacer 34 but adjacent to the sub spacer 35. Furthermore, since the extended light blocking portions 36 are disposed relative to the red and blue pixel units RPX and BPX, which are the first pixel units PX1, but are not disposed relative to the green pixel units GPX, which are the second pixel units PX2, the aperture ratio of the green pixel unit GPX, which is the second pixel unit PX2, is higher than the aperture ratios of the red and blue pixel units RPX and BPX, which are the first pixel units PX1. The green pixel units GPX, which are the second pixel units PX2 that selectively transmit green light having highest relative luminous efficiency, have a high aperture ratio. This advantageously reduces a decrease in the brightness caused by the extended light blocking portion 36.

The extended light blocking portion 36 is described in detail. As illustrated in FIG. 3, the extended light blocking portions 36 extend continuously from the intersecting portions 24A of the inter-pixel light blocking portion 24, which overlap the spacer 34 and the sub spacers 35. The extended light blocking portions 36 extend to the inner sides of the four first pixel units PX1 (two red pixel units RPX and two blue pixel units BPX) separated by the intersecting portion 24A. In this configuration, the four extended light blocking portions 36 are dispersedly disposed relative to the four first pixel units PX1, allowing each extended light blocking portion 36 to have a small area while having a sufficient light blocking function, compared with extended light blocking portions extending to two first pixel units PX1 adjacent to each other in the X axis direction or in the Y axis direction. This reduces a difference in the aperture ratio between the first pixel unit PX1 that has the extended light blocking portion 36 and the second pixel unit PX2 that does not have the extended light blocking portion 36. The four extended light blocking portions 36 extending from the same intersecting portion 24A each selectively extend to one of corners C, which is closest to the center of the intersecting portion 24A, of the corresponding first pixel unit PX1. Since the spacer 34 and the sub spacers 35 each overlap the center of the intersecting portion 24A of the inter-pixel light blocking portion 24 as described above, the bits rubbed off by the spacer 34 and the sub spacers 35 are likely to be distributed around the corners C, which are closest to the centers of the intersecting portions 24A, of the four first pixel units PX1 adjacent to the spacer 34 and the sub spacers 35. To solve the problem, in this embodiment, the extended light blocking portions 36 each selectively extend continuously to the corner C, which is closest to the center of the intersecting portion 24A, of the respective four first pixel units PX1 adjacent to the spacer 34, and thus the bright dot defect caused by the rubbed-off bits is unlikely to be visually perceivable. Furthermore, the extended light blocking portion in this embodiment dose not lower the aperture ratio of the first pixel unit PX1 as much as an extended light blocking portion extending to two or more corners C of the first pixel unit PX1. The extended light blocking portion in this embodiment is preferably employed to reduce a decrease in the brightness. The extended light blocking portions 36 each have a triangular planar shape having two sides extending along the corner C of the first pixel unit PX1 that is closest to the center of the intersecting portion 24A. One of the three sides of the extended light blocking portion 36 farthest from the center of the intersecting portion 24A is a curved side, which is a part of the circle centered at the center of the intersecting portion 24A. The four extended light blocking portions 36 extending from the same intersecting portion 24A have the equal area. This allows the four first pixel units PX1 separated by the intersecting portion 24A to have the same aperture ratio, regardless of whether the spacer 34 is disposed. The extended light blocking portions 36 are disposed in an area corresponding to a possible scattering area of the bits of the alignment film rubbed off by the spacer 34 or the sub spacer 35. In other words, the second extended light blocking portions 36B disposed relative to the first pixel unit PX1 adjacent to the sub spacer 35 is smaller than the first extended light blocking portion 36A disposed relative to the first pixel unit PX1 adjacent to the spacer 34. As described above, since the scattering area of the bits of the alignment film rubbed off by the sub spacer 35 is basically smaller than the scattering area of the bits of the alignment film rubbed of f by the spacer 34, the second extended light blocking portion 36B smaller than the first extended light blocking portion 36A sufficiently reduces the possibility that a bright dot defect will be visually perceivable at the first pixel units PX1 adjacent to the sub spacer 35. Furthermore, the first pixel unit PX1 having the second extended light blocking portion 36B keeps a high aperture ratio, and thus a decrease in the brightness is reduced.

As described above, the liquid crystal panel (display panel) 11 according to the embodiment includes the two substrates 11A and 11B, the pixel units PX arranged in rows and columns in the place surface area of the substrates 11A and 11B and at least including the first pixel units PX1 that are adjacent to each other and the second pixel units PX2 that have a different color from the first pixel units PX1 and are configured to provide a brighter display than the first pixel units PX1 when the first pixel units PX1 and the second pixel unit PX2 are at the same gray level, the inter-pixel light blocking portion 24 disposed on at least one of the two substrates 11A and 11B and separating the pixel units PX adjacent to each other, the spacer 34 overlapping the inter-pixel light blocking portion 24 at a position adjacent to at least one of the first pixel units PX1 and disposed between the two substrates 11A and 11B to keep a distance between the two substrates 11A and 11B, and the extended light blocking portions 36 extending from the inter-pixel light blocking portion 24 to the inner sides of the first pixel units PX1.

With this configuration, a predetermined image is displayed when each of the pixel units PX arranged in rows and columns in the plate surface area of the two substrates 11A and 11B provides a display at a predetermined gray level. A display gray level of each of the pixel units PX is reliably kept by the inter-pixel light blocking portions 24, which separate the pixel units PX adjacent to each other. The distance between the substrates 11A and 11B is maintained by the spacer 34 disposed therebetween. The spacer 34 is adjacent to at least one of the first pixel units PX1. The spacer 34, which is disposed between the substrates 11A and 11B, may rub against a surface of one of the substrates 11A and 11B. The bits rubbed off by the spacer 34 may cause a bright dot defect. Although the spacer 34 overlaps the inter-pixel light blocking portion 24, the bright dot defect caused by the rubbed-off bits may be visually perceivable at the first pixel unit PX1 adjacent to the spacer 34. To solve the problem, the inter-pixel light blocking portion 24 includes the extended light blocking portions 36 each extending to the inner side of the corresponding first pixel unit PX1. This reduces the possibility that the bright dot defect will be visually perceivable at the first pixel unit PX1 adjacent to the spacer 34 and reduces the difference in the aperture ratio between the first pixel unit PX1 adjacent to the spacer 34 and the first pixel unit PX1 not adjacent to the spacer 34. Furthermore, the first pixel units PX1 have the extended light blocking portions 36 but the second pixel units PX2, which provide a bright display compared with the first pixel unit PX1 when the first and second pixel units PX1 and PX2 are at the same gray level, does not have the extended light blocking portion 36. This allows the second pixel unit PX2 to have a higher aperture ratio than the first pixel unit PX1, reducing a decrease in the brightness caused by the extended light blocking portion 36.

The first pixel units PX1 include at least four first pixel units PX1 adjacent to each other in the row direction and the column direction. The extended light blocking portions 36 extend from the intersecting portion 24A of the inter-pixel light blocking portion 24, which separates the four first pixel units PX1 adjacent to each other in the row direction and the column direction, to the inner sides of the four first pixel units PX1. In this configuration, the four extended light blocking portions 36 are dispersed to the four first pixel units PX1. This configuration allows each of the extended light blocking portions 36 to have a small area while providing a sufficient light blocking function, compared with extended light blocking portions extending to the inner sides of two first pixel units PX1 adjacent to each other in the row direction or in the column direction. This reduces a difference in the aperture ratio between the first pixel unit PX1 having the extended light blocking portion 36 and the second pixel unit PX2 not having the extended light blocking portion 36.

The spacer 34 overlaps the center of the intersecting portion 24A. The first pixel units PX1 each have multiple corners C in a plan view. The extended light blocking portions 36 each extend continuously to one of the corners C, which is closest to the center of the intersecting portion 21A, of the respective four first pixel units PX1. In this configuration, bits rubbed off by the spacer 34, which overlaps the center of the intersecting portion 24A of the inter-pixel light blocking portion 24, are likely to be distributed around one of the corners C of the intersecting portion 24a, which is closest to the center of the intersecting portion 24A. To solve the problem, in this embodiment, the extended light blocking portions 36 each selectively extend continuously to the corner C, which is closest to the center of the intersecting portion 24A, of the respective four first pixel units PX1 adjacent to the spacer 34. This reduces the possibility that the bright dot defect caused by the rubbed-off bits will be visually perceivable. Furthermore, the extended light blocking portion 36 in this configuration does not lower the aperture ratio of the first pixel unit PX1 as much as an extended light blocking portion that extends to two or more corners C of the first pixel unit PX1. This configuration advantageously reduces a decrease in the brightness.

The four extended light blocking portions 36 disposed relative to the four first pixel units PX1 have the equal area. This configuration allows the four first pixel units PX1 adjacent to each other in the row direction and the column direction to have the same aperture ratio regardless of whether the spacer 34 is disposed.

The pixel units PX are arranged such that a set of the four first pixel units PX1 and the second pixel unit PX2 are arranged alternately and repeatedly in the row direction, and the set of the four first pixel units PX1 and the second pixel unit PX2 are each arranged repeatedly in the column direction. Sets of the four extended light blocking portions 36, which are disposed relative to the sets of four first pixel units PX1, are arranged in the row direction and the column direction to form a grid-like pattern. In this configuration, the sets of the four extended light blocking portions 36 arranged in a grid-like pattern reduce the possibility that the bright dot defect caused by the spacers 34 will be visually perceivable.

Furthermore, the sub spacer 35 is disposed on the CF substrate (first substrate) 11A of the two substrates 11A and 11B and is spaced apart from the array substrate (second substrate) 11B. The sub spacer 35 overlaps the inter-pixel light blocking portion 24 at a position adjacent to at least one of the first pixel units PX1 that is different from one adjacent to the spacer 34. In this configuration, when the CF substrate 11A of the two substrates 11A and 11B is deformed by an external force, the deformation of the CF substrate 11A is stopped by the sub spacer 35 that has come in contact with the array substrate 11B. The sub spacer 35, which is spaced apart from the array substrate 11B when no external force is applied to the substrates 11A and 11B, is less likely to rub against the surface of the array substrate 11B than the spacer 34, and thus the alignment film is unlikely to be rubbed off. A bright point defect caused by the sub spacer 35 is less visually perceivable than that caused by the spacer 34.

Furthermore, the extended light blocking portions 36 at least include the first extended light blocking portions 36A extending to the inner sides of the first pixel units PX1 adjacent to the spacer 34 and the second extended light blocking portions 36B extending to the inner sides of the first pixel units PX1 adjacent to the sub spacer 35. The second extended light blocking portion 36B has a smaller area than the first extended light blocking portion 36A. With this configuration, the first extended light blocking portion 36A will reduce the possibility that a bright point defect will be visually perceivable at the first pixel unit X1 adjacent to the spacer 34 and the second extended light blocking portion 36B reduces the possibility that a bright point defect will be visually perceivable at the first pixel unit PX1 adjacent to the sub spacer 35. Although the second extended light blocking portion 36B has a smaller area than the first extended light blocking portion 36A, the bright dot defect caused by the sub spacer 35 is usually a minor defect, and thus the second extended light blocking portion 36B reduces the possibility that the bright dot defect will be readily visually perceivable. Since the second extended light blocking portion 36B has a smaller area then the first extended light blocking portion 36A, the aperture ratio of the first pixel unit PX1 having the second extended light blocking portion 36B is maintained high. This advantageously reduces a decrease in the brightness.

Furthermore, the first pixel units PX1 include pixel units having different colors. Since the extended light blocking portions 36 extend to the inner sides of the first pixel units PX1, a difference in the aperture ratio between the first pixel unit PX1 adjacent to the spacer 34 and the first pixel unit PX1 not adjacent to the spacer 34 is reduced. This reduces the possibility that the first pixel units PX1 having different colors will have color unevenness.

Furthermore, the first pixel unit PX1 is a low relative luminous efficiency pixel unit that selectively transmits light having a wavelength of low relative luminous efficiency compared with the second pixel unit PX2. The second pixel unit PX2 is a high relative luminous efficiency pixel unit that selectively transmits light having a wavelength of high relative luminous efficiency compared with the first pixel unit PX1. With this configuration, the high relative luminous efficiency pixel unit, which is the second pixel unit PX2, selectively transmits light having a wavelength of a high luminous efficiency compared with the low relative luminous efficiency pixel unit, which is the first pixel unit PX1, and provides a brighter display than the low relative luminous efficiency pixel unit when the high relative luminous efficiency pixel unit and the low relative luminous efficiency pixel are at the same gray level. The high relative luminous efficiency pixel unit, which does not have the extended light blocking portion 36, has a higher aperture ratio than the low relative luminous efficiency pixel. This reduces a decrease in the brightness caused by the extended light blocking portion 36.

Furthermore, the low relative luminous efficiency pixel units include the red pixel unit RPX, which selectively transmits red light having a wavelength in a wavelength range of red, and the blue pixel unit BPX, which selectively transmits blue light having a wavelength in a wavelength range of blue. The high relative luminous efficiency pixel units at least include the green pixel unit GPX, which selectively transmits green light having a wavelength in a wavelength range of green. In this configuration, the green pixel unit GPX, which selectively transmit green light having a wavelength in a wavelength range of green that is higher in relative luminous efficiency than the red and blue pixel units RPX and BPX, provides a bright display. The green pixel unit GPX, which does not have the extended light blocking portion 36, has a higher aperture ratio than the red and blue pixel units Rx and BPX. A decrease in the brightness caused by the extended light blocking portion 36 is reduced.

Second Embodiment

A second embodiment of the technology is described with reference to FIG. 6. In the second embodiment, a spacer 134, a sub spacer 135, and an extended light blocking portion 136 are positioned differently from those in the first embodiment. In the second embodiment, components, effects, and advantages identical to those in the first embodiment are not described in detail.

Figure 6:
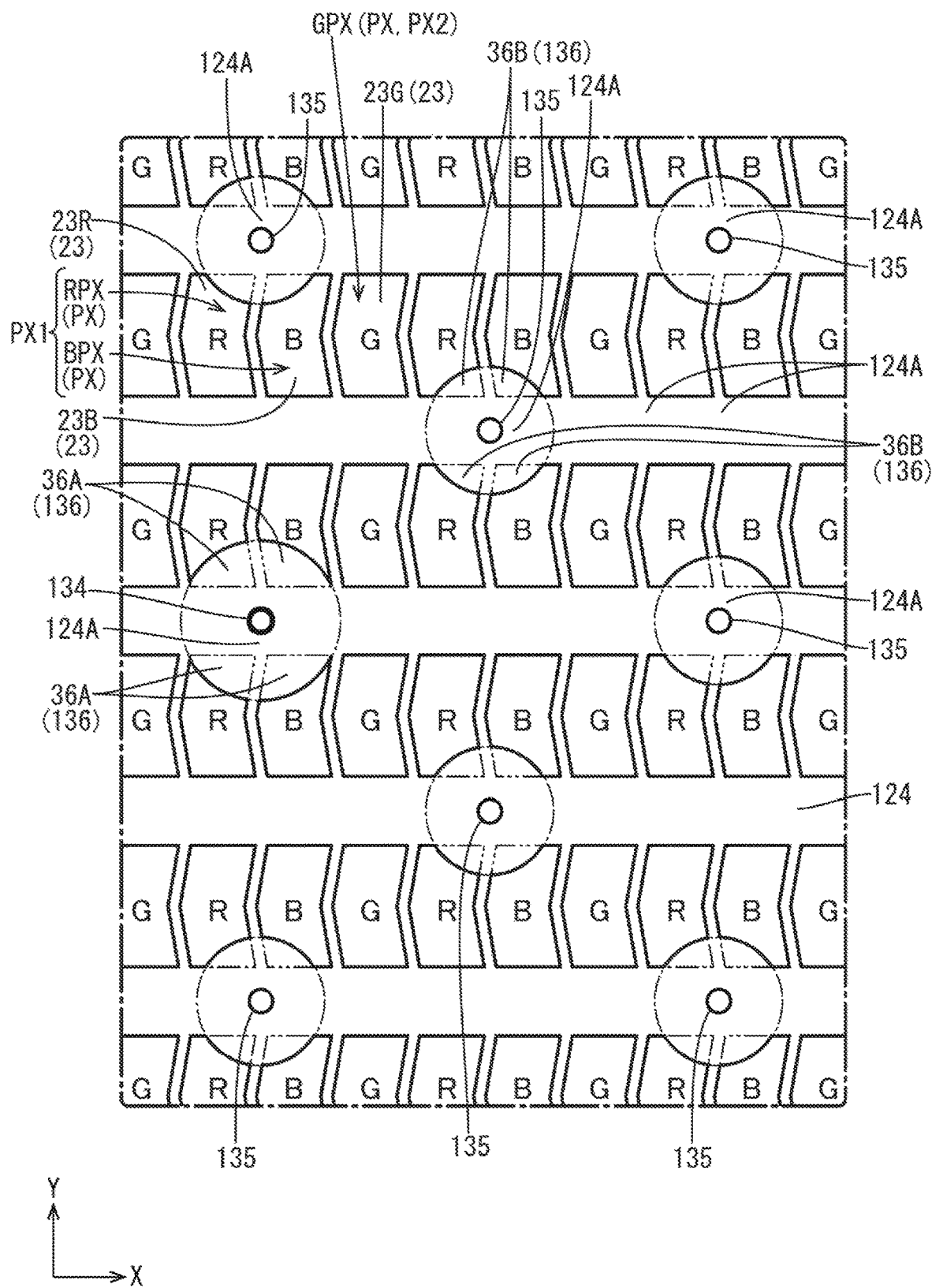
FIG. 6 is a plan view illustrating a pixel arrangement on a CF substrate included in a liquid crystal panel according to a second embodiment of the technology described herein.

As illustrated in FIG. 6, the spacer 134 and the sub spacers 135 according to the second embodiment are arranged in the X axis direction and the Y axis direction in a staggered pattern. In this configuration, all rows of the grid-like inter-pixel light blocking portion 124, which extend in the X axis direction, are spacer arrangement rows in which the spacer 134 and/or the sub spacers 135 are arranged. The distribution density of the spacers 134 and the sub spacers 135 in each row is about a half of that in the first embodiment. In accordance with the arrangement of the spacers 134 and the sub spacers 135, sets of four extended light blocking portions 136, which extend from the intersecting portions 124A of the inter-pixel light blocking portion 124 and separate the four first pixel units PX1, are arranged in the X axis direction and the Y axis direction in a staggered pattern. For example, if small-sized pixel units are employed as the pixel units PX for higher-definition images, some bright dot defects would be visually perceivable because the extended light blocking portions 136 do not sufficiently block light. Conversely, if large-sized pixel units are employed as the pixel units PX, the planar shape of the extended light blocking portions 136 would be visually perceivable. Such display defects caused by the extended light blocking portion 136 are unlikely to be visually perceivable in this embodiment, because the four extended light blocking portions 136 disposed relative to the four first pixel units PX1 are arranged in the X axis direction and the Y axis direction in a staggered pattern.

As described above, in this embodiment, the pixel units PX are arranged such that a set of four first pixel units PX1 and a set of second pixel units PX2 are alternately and repeatedly arranged in the row direction and the set of four first pixel units PX1 and the set of second pixel units PX2 are each repeatedly arranged in the column direction. The four extended light blocking portions 136 disposed relative to the four first pixel units PX1 are arranged in the row direction and the column direction in a staggered pattern. For example, if small-sized pixel units are employed as the pixel units PX for higher-definition images, some bright dot defects would be visually perceivable because the extended light blocking portions 136 do not sufficiently block light. Conversely, if large-sized pixel units are employed as the pixel units PX, the planar shape of the extended light blocking portions 136 would be visually perceivable. Such display defects caused by the extended light blocking portion 136 are unlikely to be visually perceivable in this embodiment, because the four extended light blocking portions 136 disposed relative to the four first pixel units PX1 are arranged in the X axis direction and the Y axis direction in a staggered pattern.

Third Embodiment

A third embodiment of the technology is described with reference to FIG. 7. In the third embodiment, a spacer 234 and an array substrate 211B have configurations different from those in the first embodiment. In the third embodiment, components, effects, and advantages identical to those in the first embodiment are not described in detail.

Figure 7:
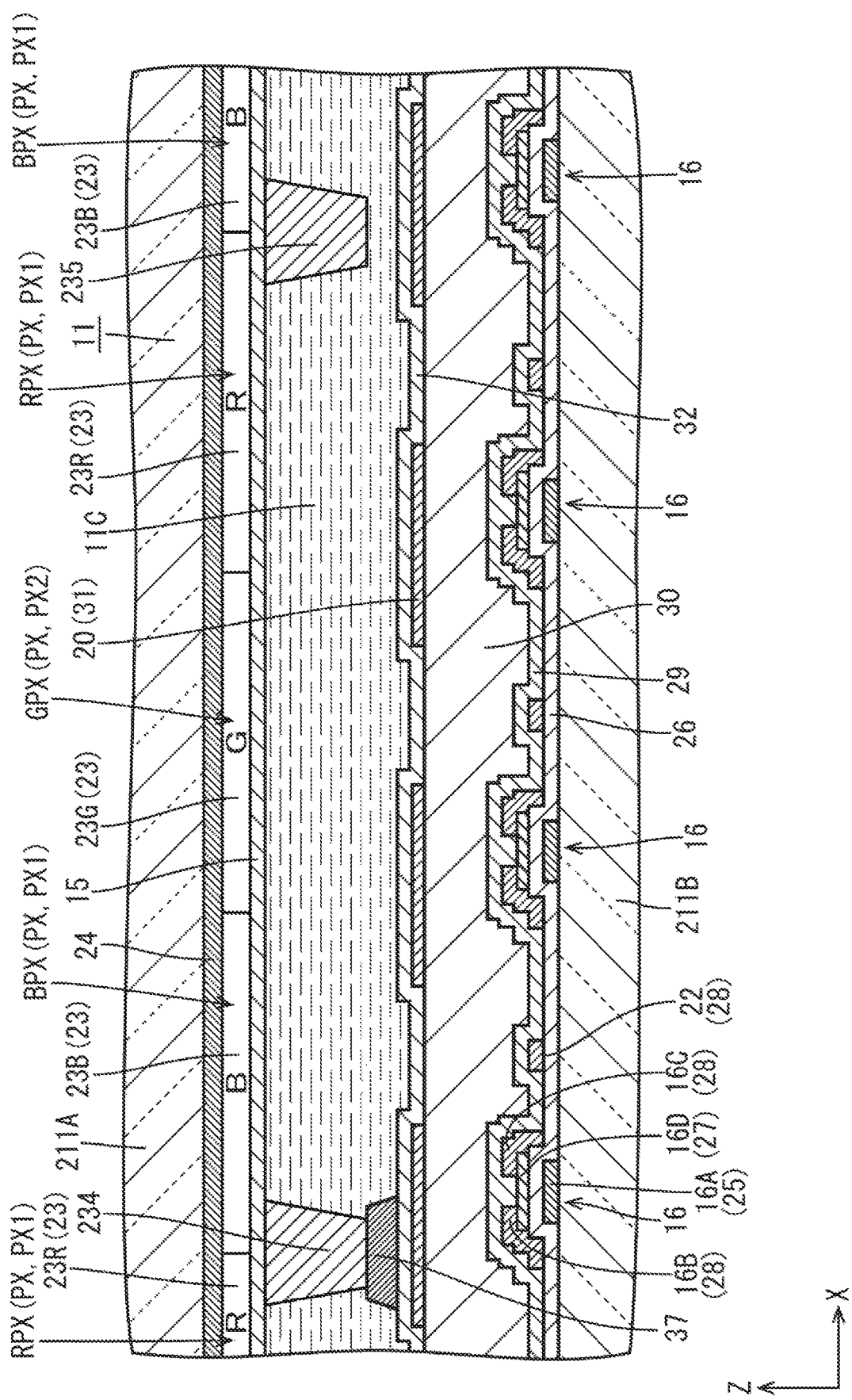
FIG. 7 is a cross-sectional view of a liquid crystal panel according to a third embodiment of the technology described herein.

As illustrated in FIG. 7, a spacer contact portion 37 protrudes from the array substrate 211B of the third embodiment in the Z axis direction toward the CF substrate 211A and is in contact with the spacer 234. The spacer contact portion 37 is formed of an insulating film on the upper surface of the second transparent electrode film and is selectively disposed at a position corresponding to the spacer 234 on the CF substrate 211A. The spacer contact portion 37 has a substantially trapezoidal cross-sectional shape and has a leading end surface in contact with the leading end surface of the spacer 234. The spacer contact portion 37 is covered by an alignment film. The alignment film is locally thin at the leading end surface of the spacer contact portion 37. In this configuration, only tiny bits of the alignment film would be rubbed off by the spacer 234 in contact with the spacer contact portion 37, reducing the possibility that the bright dot defect caused by the rubbed-off bits will be visually perceivable. Furthermore, in this embodiment the production oi the spacers 234 and the sub spacers 235 is easy because the height of the spacers 234 and that of the sub spacers 235 are equal.

As described above, in this embodiment, the spacer 234 protrudes from the CF substrate 211A toward the array substrate 211B, and the spacer contact portion 37 protrudes from the array substrate 211B toward the CF substrate 211A and is in contact with the spacer 234. In this configuration, the substrate 211A and the substrate 211B are spaced apart from each other by the spacer 234 on the CF substrate 211A, which is in contact with the spacer contact portion 37 on the array substrate 211B. When a thin film such as the alignment film is formed on the surface of the array substrate 211B, the thin film is likely to be locally thin at the surface of the spacer contact portion 37 of the array substrate 211B. Thus, only tiny bits of the alignment film would be rubbed off by the spacer 234 in contact with the spacer contact portion 37, reducing the possibility that the bright dot defect caused by the rubbed-off bits will be visually perceivable.

Fourth Embodiment

A fourth embodiment of the technology is described with reference to FIG. 8. In the fourth embodiment, pixel units PX are different from those in the first embodiment. In the fourth embodiment, components, effects, and advantages identical to those in the first embodiment are not described in detail.

Figure 8:
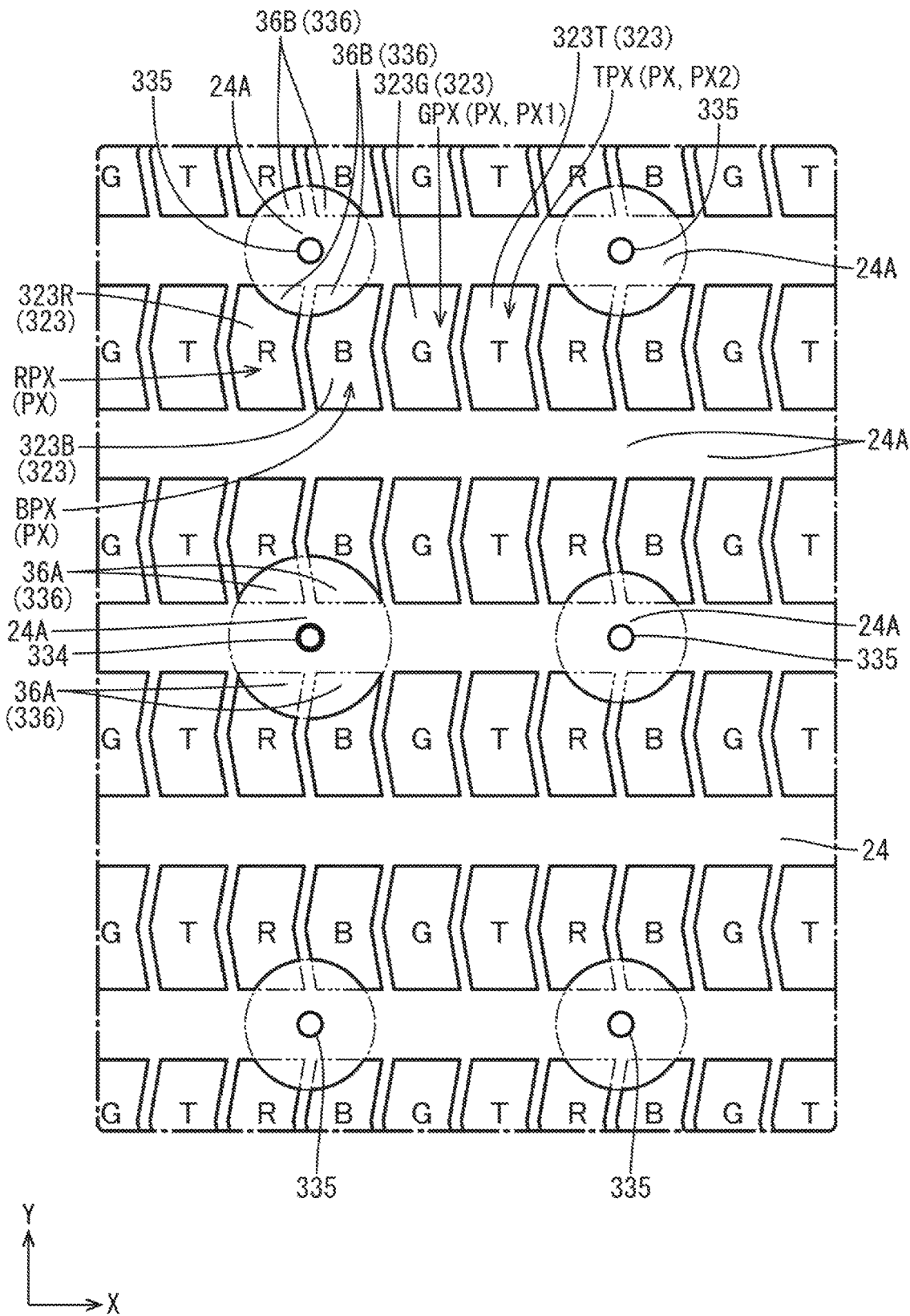
FIG. 8 is a plan view illustrating a pixel arrangement on a CF substrate included in a liquid crystal panel according to a fourth embodiment of the technology described herein.

As illustrated in FIG. 8, a color filter 323 according to the fourth embodiment includes a substantially transparent colorless portion 323T in addition to a red filter 323R, a blue filter 323B, and a green filter 323G. The colorless portion 323T transmits all visible light and does not have wavelength selectivity. In other words, the colorless portion 323 transmits all of red light, blue light, and green light. The colorless portion 323T and the pixel electrode opposing the colorless portion 323T form a transparent pixel unit TPX. The pixel units PX according to the fourth embodiment include the transparent pixel unit TPX that does not have a color and transmits all visible light in addition to the red pixel unit BPX, the blue pixel unit BPX, and the green pixel unit GPX. Among the red, blue, green, and transparent pixel units RPX, BPX, GPX, and TPX, the red, blue, and green pixel units RPX, BPX, and GPX, which absorb light other than light having a wavelength in a predetermined wavelength region with the color filters 323 and transmit less light than the transparent pixel unit TPX, are classified as the first pixel units PX1, which provide a dark display when the red, blue, green, and transparent pixel units PPX, BPX, GPX, and TPX are at the same gray level. The transparent pixel unit TPX, which hardly absorb light with the color filter 323 and transmits more light than the red, blue, and green pixel units RPX, BPX, and GPX, are classified as the second pixel unit PX2 that provides a brightest display when the red, blue, green, and transparent pixel units RPX, BPX, GPX, and TPX are at the same gray level. The first pixel unit PX1 is referred to as "low light transmission pixel unit" that transmits less light than the second pixel unit PX2. The second pixel unit PX2 is referred to as "high light transmission pixel unit" that transmits more light than the first pixel unit PX1.

Among the red, blue, and green pixel units RPX, BPX, and GPX of the first pixel units PX1, a spacer 334 and sub spacers 335 according to the fourth embodiment are selectively disposed between the red pixel unit RPX and the blue pixel unit BPX adjacent to each other in the X axis direction. In this configuration, extended light blocking portions 336 selectively extend to the inner sides of the red pixel unit RPX and the blue pixel unit BPX and is not disposed relative to the green pixel unit GPX and the transparent pixel unit TPX, which is the second pixel unit PX2. The transparent pixel unit TPX, which does not have the extended light blocking portion 336, has a higher aperture ratio than the red and blue pixel units RPX and BPX. This reduces a decrease in the brightness caused by the extended light blocking portion 336. As described in the first embodiment, the green pixel unit GPX transmits green light, which is high in relative luminous efficiency, and provides a brighter display than the red and blue pixel units RPX and BPX. Thus, a decrease in the brightness caused by the extended light blocking portion 336 is reduced when the green pixel unit GPX does not have the extended light blocking portion 336.

As described above, according to the fourth embodiment, the first pixel unit PX1 is the low light transmission pixel unit that transmits a small amount of light and the second pixel unit PX2 is the high light transmission pixel unit that transmits a large amount of light. With this configuration, the high light transmission pixel unit, which is the second pixel unit PX2, transmits more light than the low light transmission pixel unit, which is the first pixel unit PX1, and thus the high light transmission pixel unit provides a brighter display than the low light transmission pixel unit when at the high light transmission pixel unit and the low light transmission pixel unit are at the same gray level. The high light transmission pixel unit, which does not have the extended light blocking portion 336, has a higher aperture ratio than the low light transmission pixel unit. This reduces a decrease in the brightness caused by the extended light blocking portion 336.

The low light transmission pixel units include the red pixel unit RPX that selectively transmits red light having a wavelength in a wavelength range of red and the blue pixel unit BPX that selectively transmits blue light having a wavelength in a wavelength range of blue. The high light transmission pixel unit at least includes the transparent pixel unit TPX that does not have a color and transmits all visible light. The transparent pixel unit TPX, which transmits all visible light without selectively transmitting light having a wavelength in a specific wavelength range, provides a bright display compared with the red and blue pixel units RPX and BPX. The transparent pixel unit TPX, which does not have the extended light blocking portion 336, has a higher aperture ratio than the red and blue pixel units RPX and BPX. This reduces a decrease in the brightness caused by the extended light blocking portion 336.

OTHER EMBODIMENTS

The technology disclosed herein is not limited to the embodiments described above and with reference to the drawings. The following embodiments may be included in the technical scope.

(1) In the above embodiments, the spacer and the sub spacer have a circular planar shape. However, the planar shape of the spacer and the sub spacer may be changed as necessary. The spacer and the sub spacer may have a polygonal planar shape such as a triangular planar shape, a rectangular planar shape, and an octagonal planar shape, or an elliptical planar shape.

(2) In the above embodiments, the extended light blocking portions are selectively disposed relative to the pixel units adjacent to the spacers and the sub spacers. However, the extended light blocking portion tray be disposed relative to the pixel unit not adjacent to the spacer and the sub spacer. In such a case, the extended light blocking portions include a third extended light blocking portion that extends to an inner side of the first pixel unit that is not adjacent to the spacer and the sub spacer. The third extended light blocking portion may have an area equal to that of the second light extended portion. The third extended light blocking portion may be advantageously employed when the number of sub spacers is small.

(3) In the above embodiments, the area of the second extended light blocking portion is smaller than that of the first extended light blocking portion. However, the area of the second extended light blocking portion may be equal to that of the first extended light blocking portion. In such a case, the first pixel unit having the first extended light blocking portion and the first pixel unit having the second light blocking portion have the same aperture ratio, leading to a reduction in color unevenness, for example.

(4) In the above configuration (3), when the two substrates are properly bonded to each other, the first pixel unit having the first extended light blocking portion and the first pixel unit having the second extended light blocking portion have the same aperture ratio. However, when the two substrates are positionally shifted when bonded to each other, the aperture ratio of the first pixel unit having the first extended light blocking portion may differ from the aperture ratio of the first pixel unit having the second extended light blocking portion.

(5) In the above embodiments, the four extended light blocking portions extending from the intersecting portion, which separates the four pixel units, have the equal area and the same planar shape. However, the four extended light blocking portions extending from the intersecting portion, which separates the four pixel units, may have different areas and different planar shapes.

(6) In the above embodiment, the four extended light blocking potions extend from the intersecting portion, which separates the four pixel units. However, the number of extended light blocking portions extending from the intersecting portion, which separates the four pixel units, may be one, two, or three.

(7) The order of arrangement of the color filters and the pixel units in the X axis direction may be suitably changed from that in the above embodiments. The color filters and the pixel units of the same color may be arranged in the X axis direction and those of different colors may be alternately and repeatedly arranged in the Y axis direction. Alternatively, the color filters and the pixel units of different colors may be alternately and repeatedly arranged in the X axis direction and the Y axis direction.

(8) The specific planar arrangement of the spacers and the sub spacers may be suitably changed from those in the above embodiments. For example, the spacers and the sub spacers may overlap the intersecting portion of the inter-pixel light blocking portion at a position away from the center. In such a case, the spacers and the sub spacers may be disposed between the red pixel unit and the blue pixel unit adjacent to each other in the X axis direction or may be disposed between the pixel units of the same color adjacent to each other in the Y axis direction.

(9) The planar shape of the pixel electrode and the planar shape of the opening of the inter-pixel light blocking portion may be changed from those in the above embodiments as necessary.

(10) In the third embodiment, the spacer contact portion is disposed only at a position corresponding to the spacer. However, the spacer contact portion may be disposed at a position corresponding to the sub spacer, in such a case, the spacer contact portion that corresponds to the spacer and the sub spacer contact portion that corresponds to the sub spacer may have different heights.

(11) In the third embodiment, the spacer and the sub spacer have substantially the equal height. However, the spacer and the sub spacer may have different heights.

(12) In a modification of the fourth embodiment, the extended light blocking portion tray be disposed relative to the green pixel unit that transmits less light than the transparent pixel unit. In such a case, the extended light blocking portion is not disposed only relative to the transparent pixel unit.

(13) In the fourth embodiment, the color filter has a colorless portion and the pixel unit includes the transparent pixel unit. Instead of the transparent pixel unit, the color filter may include a yellow color filter that selectively transmits yellow light having a wavelength in a wavelength range of yellow and the pixel unit may include a yellow pixel unit having a yellow color. In such a case, the extended light blocking portion is not disposed relative to the yellow pixel unit, which transmits yellow light that is higher in relative luminous efficiency than red and blue light transmitted by the red and blue pixel units. However, the present technology is not limited to this configuration. Alternatively, the yellow pixel unit may be disposed in addition to the transparent pixel unit. A pixel unit having a different color from yellow may be disposed instead of the yellow pixel unit.

(14) In the above embodiments, the inter-pixel light blocking portion and the extended light blocking portions are disposed on the CF substrate. However, the inter-pixel light blocking portion and the extended light blocking portions may be disposed on the array substrate. Alternatively, the inter-pixel light blocking portion and the extended light blocking portions may be separately disposed on the CF substrate and the array substrate.

(15) In the above embodiments, the sub spacers are disposed in addition to the spacers. However, the sub spacers may be eliminated.

(16) In the above embodiments, the pixel electrodes are located above the common electrodes. However, the pixel electrodes may be located below the common electrode.

(17) In the above-described embodiments, the liquid crystal panel has a vertically-long oblong planar shape. However, the technology described herein is applicable to a liquid crystal panel having a horizontally-long oblong planar shape, a square planar shape, a circular planar shape, or an elliptical planar shape, for example.

(18) In the above embodiments, the driver is mounted on the array substrate by using COG technology. However, the driver may be disposed on the flexible board by using chip on film (COF) technology.

(19) In the above embodiments, the semiconductor film that forms the channel portion of the TFT is formed of the oxide semiconductor material. However, the material of the semiconductor film may be polysilicon (continuous grain silicon (CG silicon), which is one kind of silicon in polycrystalline form (polycrystalline silicon), or amorphous silicon).

(20) In the above embodiments, the liquid crystal panel includes the liquid crystal layer between two substrates. However, the technology described herein is applicable to a display panel including functional organic molecules (medium layer) other than the liquid crystal material between two substrates.

(21) In the above embodiments, the TFTs are used as the switching elements of the liquid crystal panel. However, the technology described herein is applicable to a liquid crystal panel including switching elements other than the TFTs (e.g., thin film diodes (TFDs)). The technology described herein is also applicable to a black-and-white liquid crystal panel other than the color liquid crystal display panel.

(22) In the above embodiments, the liquid crystal panel is described as one example of the display panel. However, the technology described herein is applicable to other types of display panels, such as a plasma display panel (PDP), an organic EL panel, a microencapsulated electrophoretic display panel (EPD), and a micro electro mechanical system (MEMS) display panel.

The invention claimed is:

1. A display panel comprising:
two substrates;
pixel units arranged in rows and columns in a plate surface area of the two substrates and at least including first pixel units adjacent to each other and a second pixel unit that has a different color from the first pixel units and is configured to provide a brighter display than the first pixel units when the first pixel units and the second pixel unit are at a same gray level;
an inter-pixel light blocking portion disposed on at least one of the two substrates and separating the pixel units adjacent to each other;
a spacer overlapping the inter-pixel light blocking portion at a position adjacent to at least one of the first pixel units and disposed between the two substrates to keep a distance between the two substrates; and
a plurality of extended light blocking portions extending from the inter-pixel light blocking portion to inner sides of the first pixel units.

2. The display panel according to claim 1, wherein the first pixel units include at least four first pixel units adjacent to each other in a row direction and a column direction, and
the inter-pixel light blocking portion includes an intersecting portion separating the four first pixel units adjacent to each other in the row direction and the column direction, and the plurality of extended light blocking portions includes four extended light blocking portions extending from the intersecting portion to the inner sides of the four first pixel units.

3. The display panel according to claim 2, wherein the spacer overlaps a center of the intersecting portion,
the first pixel units each have multiple corners in a plan view, and
the four extended light blocking portions each selectively extend to, among the corners of the respective four first pixel units, one closest to the center of the intersecting portion.

4. The display panel according to claim 3, wherein areas of the four extended light blocking portions extending to the four first pixel units are equal to each other.

5. The display panel according to claim 3, wherein the pixel units are arranged such that a set of the four first pixel units and the second pixel unit are alternately and repeatedly arranged in the cow direction, and the set of the four first pixel units and the second pixel unit are each repeatedly arranged in the column direction, and
sets of the four extended light blocking portions extending to the respective four first pixel units are arranged in the row direction and the column direction to form a grid-like pattern.

6. The display panel according to claim 3, wherein the pixel units are arranged such that a set of the four first pixel units and the second pixel unit are alternately and repeatedly arranged in the row direction, and
sets of the four extended light blocking portions extending to the respective four first pixel units are arranged in the row direction and the column direction to form a staggered pattern.

7. The display panel according to claim 1, further comprising a sub spacer overlapping the inter-pixel light blocking portion at a position adjacent to at least one of the first pixel units that is different from one adjacent to the spacer, the sub spacer being disposed on one of the two substrates and away from another one of the two substrates.

8. The display panel according to claim 7, wherein the plurality of extended light blocking portions at least includes a first extended light blocking portion extending to an inner side of one of the first pixel units that is adjacent to the spacer and a second extended light blocking portion extending to an inner side of one of the first pixel units that is adjacent to the sub spacer, and
the second extended light blocking portion has a smaller area than the first extended light blocking portion.

9. The display panel according to claim 1, wherein the first pixel units include pixel units of different colors.

10. The display panel according to claim 1, wherein the first pixel units are low relative luminous efficiency pixel units that selectively transmit light having a wavelength of low relative luminous efficiency compared with the second pixel unit, and the second pixel unit is a high relative luminous efficiency pixel unit that selectively transmits light having a wavelength of high relative luminous efficiency.

11. The display panel according to claim 10, wherein the low relative luminous efficiency pixel units include a red pixel unit that selectively transmits red light having a wavelength in a wavelength range of red and a blue pixel unit that selectively transmits blue light having a wavelength in a wavelength range of blue, and the high relative luminous efficiency pixel unit at least includes a green pixel unit that selectively transmits green light having a wavelength in a wavelength range of green.

12. The display panel according to claim 1, wherein the first pixel units are low light transmission pixel units that transmit a small amount of light and the second pixel unit is a high light transmission pixel unit that transmits a large amount of light.

13. The display panel according to claim 12, wherein the low light transmission pixel units include a red pixel unit that selectively transmits red light having a wavelength in a wavelength range of red and a blue pixel unit that selectively transmits blue light having a wavelength in a wavelength range of blue, and
the high light transmission pixel unit at least includes a transparent pixel unit that does not have a color and transmits all visible light.

14. The display panel according to claim 1, further comprising a spacer contact portion, wherein
the spacer protrudes from one of the two substrates toward another one of the two substrates, and
the spacer contact portion protrudes from the other one of the two substrates toward the one of the two substrates and is in contact with the spacer.

* * * * *